United States Patent [19]

Terada et al.

[11] Patent Number: 5,216,315
[45] Date of Patent: Jun. 1, 1993

[54] ANGULAR RATE SENSOR

[75] Inventors: Jirou Terada, Hirakata; Kazumitu Ueda, Sakai; Hiroshi Takenaka, Ikoma; Toshihiko Ichinose, Hirakata, all of Japan

[73] Assignee: Matsushia Electric Industrial Co., Osaka, Japan

[21] Appl. No.: 809,751

[22] Filed: Dec. 18, 1991

[30] Foreign Application Priority Data

Dec. 18, 1990 [JP] Japan ................................. 2-403076

[51] Int. Cl.$^5$ ............................................. H01L 41/08
[52] U.S. Cl. ...................................... 310/329; 73/505; 310/332; 310/346; 310/370
[58] Field of Search ................ 310/321, 323, 330–332, 310/346, 329, 358, 370; 73/505, 526, 517 A

[56] References Cited

U.S. PATENT DOCUMENTS

| | | | |
|---|---|---|---|
| 3,206,986 | 9/1965 | Christensen | 310/332 X |
| 4,349,762 | 9/1982 | Kitamura et al. | 310/332 |
| 4,610,426 | 9/1986 | Brandner | 310/332 X |
| 4,780,062 | 10/1988 | Yamada et al. | 310/332 X |
| 4,836,023 | 6/1989 | Oikawa | 73/505 |
| 5,014,554 | 5/1991 | Terada et al. | 310/370 X |
| 5,045,745 | 9/1991 | Umemoto et al. | 310/329 |
| 5,049,776 | 9/1991 | Ogawa | 310/333 |

Primary Examiner—Mark O. Budd
Attorney, Agent, or Firm—Ratner & Prestia

[57] ABSTRACT

A driving piezoelectric bimorph element for tuning fork vibration and a detecting piezoelectric bimorph element for angular rate detection are aligned and put together, end to end, with their vibration directions positioned perpendicular to each other.

Two of the above structure are made into a tuning fork like angular rate sensor. The polarization directions of the piezoelectric elements, that make up the piezoelectric bimorph element by bonding them together are made the same and also the two outer electrodes of the bimorph element are connected electrically with each other, with a resultant angular rate sensor capable of detecting angular rates in a stable manner against changing ambient temperatures. Particularly, the use of a conductive film electrode for making a connection between two outer electrodes and the almost equal surface areas between two outer electrodes made it possible for the angular rate sensor to detect angular rates with much stability and less temperature drifts.

4 Claims, 4 Drawing Sheets

ANGULAR RATE SENSOR

BACKGROUND OF THE INVENTION

In recent years, the development of the computer technology has been remarkable and products with a variety of functions have been materialized as application of the computer technology. This trend of the industry has brought about increasing requirements for the various sensors of a higher performance to work together with computers. The applications of angular rate sensors cover such areas as the automobile navigation system utilizing a angular velocity component detected by the sensor, the direction detector in robots, the stabilizer in various driving mechanisms and the like. The angular rate sensor with such applications tends to require compactness and high performance to serve its purposes. So far, the inertial navigation equipment of gyroscopes has been mainly used in finding a moving direction of vehicles such as airplanes and ships. This inertial navigation equipment is reliable enough in direction finding, but it is big and expensive because it is a mechanical system, making it difficult to use in the consumer electronic equipment which usually requires decreasing sizes. On the other hand, there is the oscillating gyro under proposal (Japanese Patent Application Number S-59-55420), which utilizes a vibrating mass instead of a rotating motion to detect an angular rate, derived from the so-called Coriolis force of the vibrating mass. The oscillating gyro can be considered as an oscillating sensor of a tuning fork structure. It is composed of two rectangular plates of an elastic element, the one of which is for driving as a tuning fork and the other of which is for detecting angular rates. The two plates are longitudinally aligned and joined end to end, yet being twisted 90° with each other. Thus, the Coriolis force is detected from the detecting elastic element with a velocity (m/s) which is generated by the turning fork vibration. An explanation on the conventional angular rate sensor will be given in the following with a help of a drawing: FIG. 7 shows a block diagram inclusive of the angular rate sensor and its driving circuits. Each of the driving piezoelectric bimorph elements 103 and 104 working as the driving elastic element is joined end to end by the connecting means 105 and 106 with each of the detecting piezoelectric bimorph elements 101 and 102 working as a detecting elastic element, and aligned longitudinally along the detecting axes of thedetecting piezoelectric bimorph elements 101 and 102 and also positioned with the respective vibrating axes rectangularly crossing. The pair of bimorph element structure thus constructed is then joined by the supporting member 107 at the one end of the respective driving piezoelectric bimorph elements 103 and 104, completing a vibrating set-up. This vibrating set-up is supported and connected as well through a metal elastic element 108 by and to the base 109. Tuning fork vibrations of the vibrating set-up take place when driving the driving piezoelectric bimorph elements 103 and 104. When an angular rate is applied to the detecting piezoelectric bimorph elements of the vibrating set-up, 101 and 102, an angular rate output is obtained from the detecting piezoelectric bimorph elements 101 and 102. A detailed explanation on the operation of the above whole set-up will follow: A drive signal supplied from the driving circuit 110 to the driving piezoelectric bimorph element 103 will activate the driving piezoelectric bimorph element 104 to a resonating vibration. A feedback loop is formed by connecting the driving circuit 110, the automatic gain control circuit (AGC circuit) 111, the driving monitor 113 and the driving piezoelectric bimorph elements 104 and 103 to start a tuning fork vibration. The amplitude signal gained from the driving bimorph element 104 is fedback to the driving circuit 110 after the AGC circuit 111, keeping the amplitude of the tuning fork vibration constant. By taking out a part of the phase signal information of the detecting signal generated in the driving piezoelectric bimorph by the driving monitor 113, a DC detect signal corresponding to the angular rate detected after the rectifying circuit 115 and the filter circuit 116 for low pass filtering is outputted from the angular rate signal component obtained at the detecting piezoelectoric bimorph elements 101 and 102. Incidentally, when the angular rate sensor of this kind is subjected to a temperature change, a pyroelectric effect caused by the polarization magnitude changes corresponding to the temperature change rate will be brought about with a resultant application of a self bias voltage to the piezoelectric bimorph. This self bias voltage is caused by changing increment of the surface electric charges generated in the piezoelectric bimorph element. The self bias voltage causes a large fluctuation in the detecting information signal (off-set voltage) of the angular rate sensor. Although the temperature change magnitude may be the same, a smaller variation in the off-set voltage of the angular rate detecting signal is observed with an application of mildly changing temperature, whereas the off-set voltage changes greatly with an application of temperature changing by steps. In other words, the temperature drift characteristic changes in off-set voltage) which makes one of the important performance factors for an angular rate sensor, is greatly affected by the pyroelectric effect of the piezoelectric vibrators composed of piezoelectric bimorph elements. With the conventional tuning fork type angular rate sensors of piezoelectric vibrators that comprise piezoelectric bimorph elements, the temperature drift is caused by the adverse effect of the thermal expansion particular to the piezoelectric vibrators and the foregoing pyro-electric effect. Therefore, an application of a far infrared radiation or a temperature change to the piezoelectric vibrators which are inherently vulnerable will generate an electromotive force. In other words, just because of this temperature drift, the conventional vibration type angular rate sensors such as the tuning fork type and the like have the limitation as an high precision sensor and it has been considered difficult to improve them to highly precise sensors.

SUMMARY OF THE INVENTION

An object of this invention is to solve the foregoing difficulties and to provide an angular rate sensor which can detect angular rate steadily, being free from the temperature drift caused by changes in the ambient temperature and the like.

In order to achieve the above object, this invention discloses the following set-up: A driving piezoelectric bimorph element to provide tuning fork vibration and a detecting piezoelectric bimorph element to detect angular rate and a first connecting means which joins the driving piezoelectric bimorph element to the detecting piezoelectric bimorph element, end to end, with the respective vibration axes perpendicularly positioned with each other and a second connecting means which joins the pair of the driving piezoelectric bimorph element and the detecting piezoelectric bimorph element combination prepared as in the foregoing, forming a tuning fork structure. Besides, at least one of the driving piezoelectric bimorph element and the detecting piezoelectric bimorph element is a piezoelectric bimorph element having two plates of piezoelectric element of the same polarization direction bonded together with a constant elasticity electric conductor and an intermediate electrode placed between the two plates. The two outer electrodes of the piezoelectric bimorph element made of the two plates of the piezoelectric element thus being combined are connected electrically. Furthermore, the method employed to connect the two outer electrodes is to form conducting circuits of a conductive film structure on the surface of the piezoelectric element using a conductive paint and the like. Particularly, when the thickness of the two plates of the piezoelectric element to be put together is almost of an equal magnitude, the areas of the electrodes situated at the outer sides of the piezoelectric bimorph element are made almost equal to each other. A partial section of one of the two outer electrodes of the piezoelectric bimorph element is split to form an independent small electrode which is connected electrically by electrical electrodes to the constant elasticity conductor and to the intermediate electrode of the piezoelectric bimorph element, serving as a driving electrode for the driving piezoelectric bimorph element and as an outputelectrode of detecting signal for the detecting piezoelectric bimorph element. The cause of the off-set voltage fluctuations that pose a problem with the conventional angular rate sensors is attributed to the pyroelectric effect and the thermal expansion effect of piezoelectric elements, the thermal expansion effect of the piezoelectric bimorph element made by bonding piezoelectric elements with a constant elasticity conductor placed in between. Corresponding to the thermal changes per unit time due to the pyroelectric effect, the polarization magnitude changes will result in generation of electrical charges in the piezoelectric bimorphs as well as electrical charges by the strain force due to different thermal expansions. A voltage caused by these electrical charges will bring about a temperature characteristic change in the off-set voltage. According to this invention, the two plates of a piezoelectric element having the same direction polarization are bonded together with an intermediate electrode placed in between, and the two electrodes formed on the external sides of the piezoelectric bimorph element are connected with electrical electrodes formed byelectrically conductive films. By this arrangement, the electrical charges generated are off-set with each other. In addition, when the thickness of the piezoelectric elements is almost equal to each other, the electrical charges generated in each of the two piezoelectric elements are made almost the same between the two by having the electrode areas of the two piezoelectric elements made almost equal to each other, thus further assuring off-setting of the electrical charges to reach a neutralizing status. By this way, the changes in temperature characteristics of the off-set voltage caused by the pyroelectric effect will be minimized.

Furthermore, an employment of the structure that combines by bonding the piezoelectric element and the constant elasticity conductor, the electric charges generated by the strain due to the thermal expansion differentials created between the piezoelectric element and the constant elasticity conductor are neutralized to prevent unwanted electric charges from generation. Also, due to the tuning fork vibration employed at the time of driving, a symmetric vibration is kept with a resultant stabilized vibration amplitude. Therefore, the output signal of angular rate detecting information from the tuning fork type angular rate sensor constructed by the piezoelectric bimorph elements which have features of preventing unwanted electric charges from generation and keeping a stabilized vibration amplitude shows stabilized and excellent characteristics against temperature changes. Besides, a small electrode formed on a partial section of one of the outer sides of the piezoelectric bimorph element is connected to the intermediate electrode by conductive film electrodes and is used as the input or output electrode.

With the driving piezoelectric bimorph element, this is used as the driving electrode and with the detecting piezoelectric bimorph element as the signal detecting electrode. When energizing the driving piezoelectric bimorph element, the voltage is applied across the intermediate electrode and the both of the outer side electrodes since the driving electrode is connected to the intermediate electrode of the piezoelectric bimorph element, making a low voltage driving possible. Moreover, when the angular rate signal is taken out of the detecting piezoelectric bimorph element, the signal detecting electrode installed on the detecting piezoelectric bimorph element will let the electric charge generated by the pyroelectric effect discharge, minimizing its adverse effects.

| | |
|---|---|
| 1 & 2 | Detecting piezoelectric bimorph elements |
| 3 & 4 | Driving piezoelectric bimorph elements |
| 5 & 6 | Insulating joint members (First joint member) |
| 7 | Conductive joint member (Second joint member) |
| 1a & 1b | Electrodes |
| 1g, 1i, 1j & 11 | Conductive electrodes |
| 1f | Constant elasticity conductor |

DETAILED DESCRIPTION OF THE INVENTION

Figure 1:
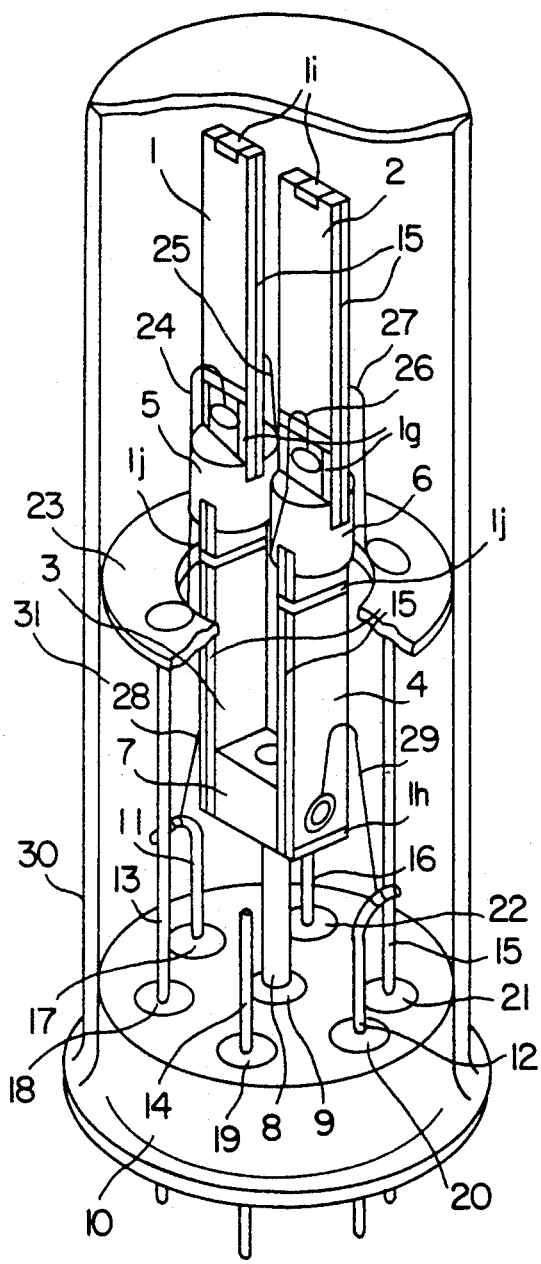
FIG. 1 shows a perspective view of an angular rate sensor, one application example of this invention, with a partially cutaway view to illustrate its construction.

In the following, an explanation of an angular rate sensor, that is one application example of this invention, will be made with a help of drawings: FIG. 1 is a perspective view of the angular rate sensor of this example, showing its inside structure. As shown in this FIG. 1, the angular rate sensor is made up of the detecting piezoelectric bimorph elements 1 and 2, and the driving piezoelectric bimorph elements 3 and 4. In this particular example, a piezoelectric ceramic material mainly composed of $Pb(Mg_{1/3}Nb_{2/3})O_3$, $PbTiO_3$ and $PbZrO_3$ is used to make the detecting piezoelectric bimorph elements 1 and 2, and the driving piezoelectric bimorph elements 3 and 4.

As shown in the drawing 2(a), the detecting piezoelectric elements 1 and 2 use two plates of the detecting piezoelectric ceramic 1b, each of which has an outline dimension of 9×1.6×0.35 mm, and the electrode 1a on both sides.

Figure 2A:
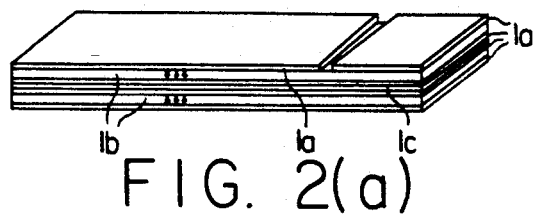
FIG. 2 shows the perspective views of production processes for the piezoelectric bimorph element to be used in the same application example of the angular rate sensor.
Figure 2B:
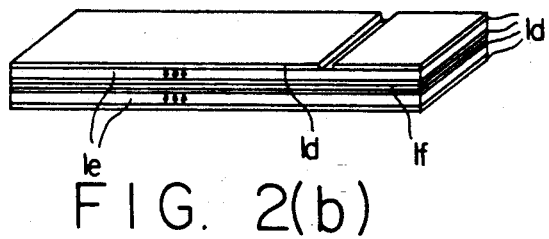
Figure 3A:
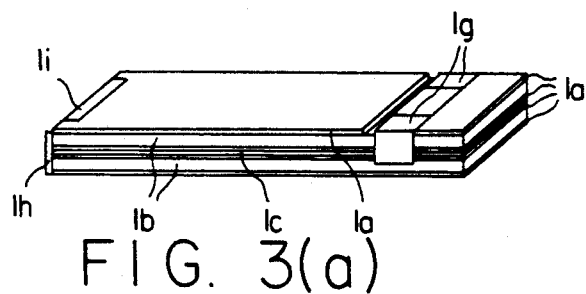
FIG. 3 illustrates the structure of the detecting piezoelectric bimorph element as used in the same example of the angular rate sensor with (a) showing the perspective view, (b) the front view, (c) the left side view and (d) the right side view respectively.
Figures 3B, 3C, 3D:
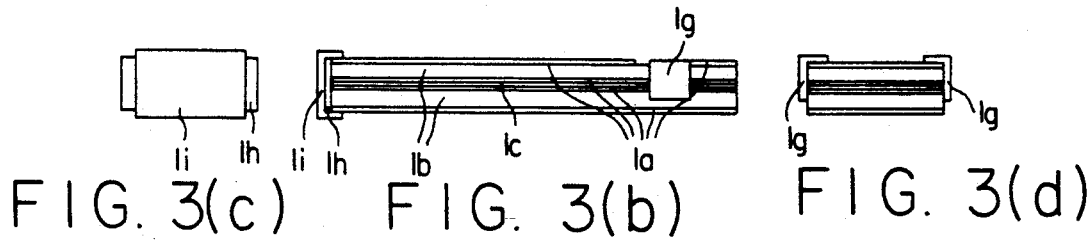
Figure 4A:
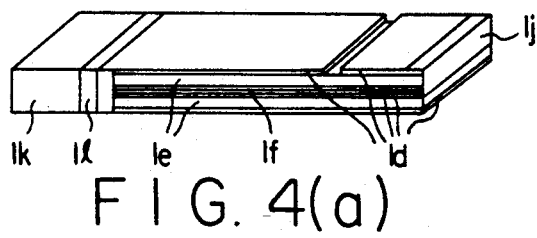
FIG. 4 illustrates the structure of the driving piezoelectric bimorph element as used in the same example of the angular rate sensor with (a) showing the perspective view, (b) the front view, (c) the left side view and (d) the right side view respectively.
Figures 4B, 4C, 4D:
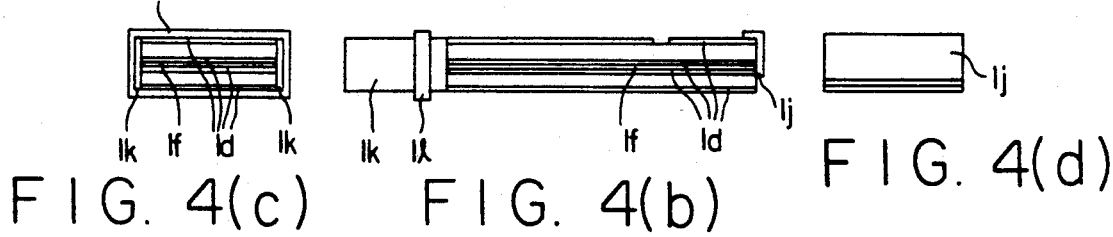
Figure 5:
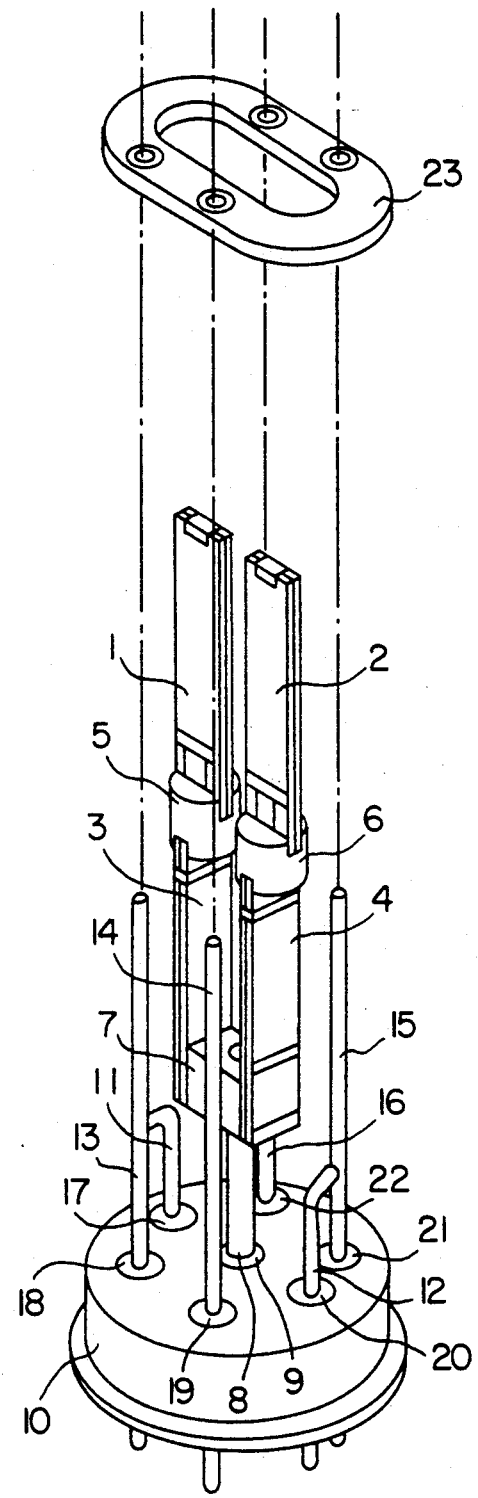
FIG. 5 shows a perspective view of assembly of the same example of the angular rate sensor.

The two plates of the detecting piezoelectric ceramic 1b are bonded together. The outer side electrodes are called here as the both side electrode and the inner side electrode as the intermediate electrode. Ag is used as the material of the electrode 1a which corresponds to the both side electrode and also the intermediate electrode. In addition, the two plates of the detecting piezoelectric ceramic 1b are put together with the constant elasticity conductor 1c between them. Besides, the polarization directions of those two plates of the piezoelectric element are made the same with each other. The driving piezoelectric bimorph elements 3 and 4 are made, as shown in FIG. 2(b), to have an outline dimension of 9×1.6×0.5 mm and Ag is used as the electrode 1d like the detecting piezoelectric bimorph element. Two plates of the driving piezoelectric ceramic 1e are bonded together with the constant elasticity conductor 1f between them. The polarization directions of those two plates are made the same with each other. The constant elasticity conductor 1c has an elasticity characteristic to work as a reinforcement structure when the two piezoelectric ceramic plates are put together and operated as a vibrating element and also has a function to work as an electric conductor connecting to the inner electrode of the piezoelectric ceramic as an intermediate electrode. For this, such metals as iron nickel alloys, Kovar, phosphorbronze and the like can be used. Also, some of quartz, glass or ceramics, which has elastic characteristics, is coated with electric conductive films on its surface to provide electric conductivity and can be used as such. In other words, anything that has an elastic function as well as an electric conductive function can be used as the constant elasticity conductor 1c. The arrow signs of FIG. 2(a) and (b) indicate the direction of polarization. A Fe-Ni alloy was used as the constant elasticity conductor. As shown in FIG. 2(a) and (b), the electrode 1a, or 1d has a partially split structure made on one sideof the piezoelectric bimorph element 1a or 1d Its two separated sections of the electrode are insulated from each other. As shown in FIG. 3(a), (b), (c) and (d) the detecting piezoelectric bimorph elements 1 and 2 are coated with Ag or Cu conductive paste on their sides forming the conductive electrodes 1g. By this conductive means, the intermediate electrodes 1a which are held in between at the central part of the piezoelectric bimorph elements is connected electrically to the electrode 1a which is separately foemed in part. These conductive electrodes will function as the detecting output electrode. The other end of the intermediate electrodes of the piezoelectric bimorph element is insulated by epoxy resin 1h. The outer surfaces of the piezoelectric bimorph element are connected with each other by the conductive electrode 1i which is formed by coating Ag or Cu conductive paste over the insulator of epoxy resin. Thus, the detecting piezoelectric bimorph elements 1 and 2 are completed. As shown in FIG. 4(a), (b), (c) and (d) the driving piezoelectric bimorph elements 3 and 4 are coated with Ag or Cu conductive paste at the ends of the piezoelectric bimorph elements forming the conductive electrode 1j. In this way the intermediate electrodes 1d of the driving piezoelectric bimorph elements 3 and 4 are connected to the partially separated electrode 1d. The electrodes thus connected electrically will function as the driving electrode. On the other hand, the side areas of the driving piezoelectric bimorph elements 3 and 4 extending from the ends to the central part are coated with the insulator 1k of epoxy resin. Both of the outer surfaces of the piezoelectric bimorph elements are connected by coating Ag or Cu conductive paste over the epoxy resin insulator, forming the conductive electrode 1l. Thus, the driving piezoelectric bimorph elements 3 and 4 are completed. The detecting piezoelectric bimorph elements 1 and 2 and the driving piezoelectric bimorph elements 3 and 4 finished in this way are put together as shown in FIG. 5. The insulating joint members 5 and 6 as the first joint member are made frompoly amide plastics and have one set of grooves rectangularly positioned to each other on the end surfaces of the respective members. Each groove of the insulating joint member 5 takes the ends of the driving piezoelectric bimorph element 1 and the driving piezoelectric bimorph element 3 respectively by insertion and join them together. Likewise, the grooves of the insulating joint member 6 take and unite with the piezoelectric bimorph element 2 and the piezoelectric bimorph element 4 with a result of the planes of each element rectangularly positioned against each other. The electrically conductive joint member 7 as the second joint member (made, for example, of a brass block with a hole bored in the center) is put together as shown in FIG. 5 with the other ends of the two piezoelectric bimorph elements making the whole structure into a tuning fork configuration. In other words, the electrically conductive member 7 is placed between the other ends of the driving piezoelectric elements 3 and 4 and connected electrically as well as mechanically with the inner electrode surfaces of the driving piezoelectric bimorph elements 3 and 4. The lead terminals 8, 11, 12, 13, 14, 15 and 16 are the connecting means to connect electrically to the detecting piezoelectric bimorph element 1 and 2 and the driving piezoelectric bimorph elements 3 and 4. These lead terminals are mounted through and insulated from the supporting base 10 made primarily of Fe by means of the glass insulators 9, 17, 18, 19, 20, 21 and 22 corresponding to the respective lead terminals. The other ends of the lead terminals sticking out of the supporting base will serve as the electrical connecting lead terminals to the outside circuits. The inside end of the lead terminal 8 is inserted into the center hole of the electrically conductive connecting member 7 and fixed by adhesion. The intermediate junction plate 23 is for supporting the lead terminals 13, 14, 15 and 16 and serves as a junction point to connect electrically with the detecting piezoelectric bimorph elements 1 and 2 and is fixed to the lead terminals 13, 14, 15 and 16 as shown in FIG. 1. The intermediate junction plate 23 is made of phenolic resin and made to have an outline dimension of 7.0 mm in diameter and 0.6 mm in thickness and also to have four holes through which the lead terminals 13, 14, 15 and 16 are passing and supported. The intermediate junction plate 23 has cupper foils around the upper side of each hole, with which the tips of the lead terminals 13, 14, 15 and 16 are soldered, and the intermediate junction plate 23 is supported and fixed firmly. The electrode of the detecting piezoelectric bimorph element 1 is connected to the lead terminals 13 and 16 with the lead wires 24 and 25 respectively by soldering. The lead wire 24 is connected to the conductive electrode 1g of the detecting piezoelectric bimorph element 1 for obtaining a detecting signal output. The detecting piezoelectric bimorph element 2 is also connected to the lead terminals 14 and 15 with the lead wires 26 and 27 respectively by soldering. The lead wire 26 is connected to the conductive electrode 1g of the detecting piezoelectric bimorph element 2. The outer electrode of the driving piezoelectric bimorph element 4 is connected by soldering to the L-shaped tip of the lead terminal 12 with the lead wire 29. The driving voltage is applied across the both side electrodes to which the lead wire 29 is connected and the conductive electrode 1j of the driving piezoelectric bimorph element 4, which connects with the intermediate electrode and the partially separated electrode. Since the conductive electrode 1j is connected to the intermediate electrode of the driving piezoelectric bimorph element 4, the driving voltage is made to apply across the intermediate electrode and both of the outer terminals, resulting in a low driving voltage requirement.

The driving piezoelectric bimorph element 3 is likewise connected at its outer electrode to the lead terminal 11 by soldering with the lead wire 28. After all wire connections are completed the whole assembly is placed in the tubular case 30 made of Fe. Then, the periphery of the opening end of the tubular case 30 is spot welded to the supporting base 10 for hermetic sealing. When the tubular case 30 is hermetically sealed, the gas 31 is filled in the case. Now, the characteristics of the detecting piezoelectric bimorph elements 1 and 2 and the driving piezoelectric bimorph elements 3 and 4 thus prepared as an application example will be explained in the following: Four different kinds of samples to check the characteristics of the example were prepared. The details of the samples are as shown in Table 1.

Figure 6:
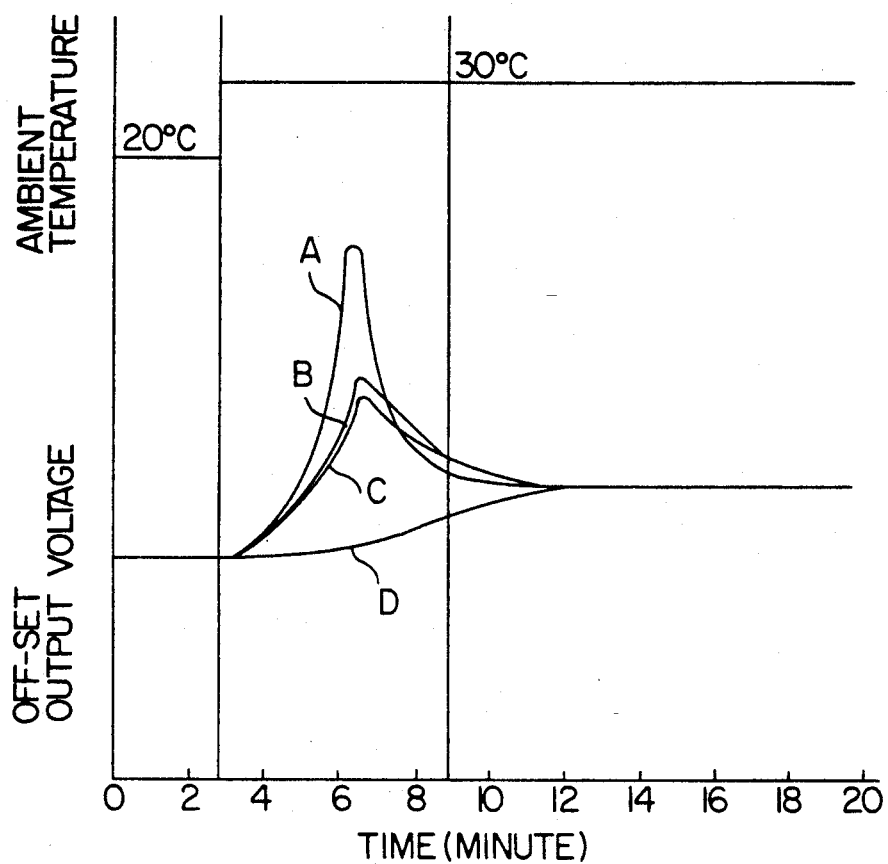
FIG. 6 shows the characteristics of the same example of the angular rate sensor with a graph showing ambient temperature changes vs off-set voltage changes of the angular rate sensor against the lapse of time.
Figure 7:
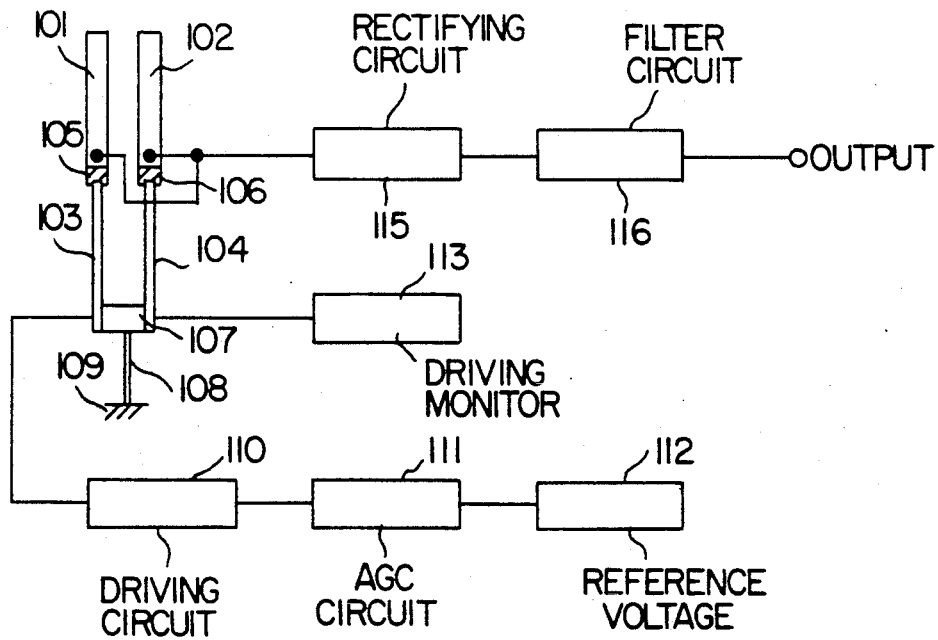
FIG. 7 is a block diagram to show a brief set-up of a conventional angular rate sensor and its driving circuits.

For checking the characteristics of these 4 kinds of angular rate sensor, the test block diagram of FIG. 7 was used as was used for checking the conventional types of angular rate sensor. The section of the angular rate sensor in FIG. 7 is replaced by the four types of angular rate sensor sample of Table 1 that are constructed by a various combination of piezoelectric bimorphs (sample codes A~D) and changes in the off-set voltage of angular rate sensor were measured. The off-set voltages were measured with the four kinds of angular rate sensor sample placed in a temperature controllable chamber to control the ambient temperature of the samples over the ranges from 20° C. to 30° C. The off-set voltage-time relations thus measured are shown in FIG. 6. The sample A uses the conventional type of piezoelectric bimorph construction with two plates of piezoelectric ceramic bonded together in series so that the polarization directions become reversed against each other and provides a reference characteristic for comparison. The sample B uses the detecting piezoelectric bimorph elements 1 and 2 and the conventional type driving elements to build a tuning fork type angular rate sensor. The sample C uses the conventional type detecting elements and the driving piezoelectric bimorph elements of 3 and 4 to form an angular rate sensor. The sample D is an angular rate sensor made of the detecting piezoelectric bimorph elements 1 and 2 and the driving piezoelectric bimorph elements 3 and 4. As shown in FIG. 6, the angular rate sensors which use the piezoelectric bimorph elements of this invention for the detecting element and/or the driving element, show smaller changes in the off-set output voltage. In other words, the angular rate sensors of above set-up have a unique feature of small off-set voltage changes against ambient temperature changes. As clearly explained in the foregoing, the angular rate sensor of this invention can reduce greatly its off-set voltage change due to the ambient temperature variation by having a construction of two plates of piezoelectric ceramic bonded together with an intermediate electrode placed in between and with the polarization direction made the same, having the outer electrodes of the two piezoelectric plates connected with each other. Its tuning fork like structure has the advantage of cancelling the pyroelectric effect which is a unique phenomenon of piezoelectric materials and caused by thermal conduction from the surroundings of the sensor, consequently reducing the off-set voltage variation of the angular rate sensor greatly. In addition, by having the driving electrode of the driving piezoelectric bimorph element connected to the intermediate electrode of the element and also to the smaller electrode formed on a section of one of the outer electrodes of the bimorph elements, a stable vibra-

TABLE 1

| Sample Code | Detecting Piezoelectric Bimorph Element | Driving Piezoelectric Bimorph Element | Off-set changes when temperature changed from 20° C. to 30° C. |
| --- | --- | --- | --- |
| A | Conventional type (Piezoelectric bimorph with series connection) | Conventional type (Piezoelectric bimorph with series connection) | Curve A of FIG. 6 |
| B | Piezoelectric bimorphs 1 and 2 of this invention | Conventional type (Piezoelectric bimorph with series connection) | Curve B of FIG. 6 |
| C | Conventional type (Piezoelectric bimorph with series connection) | Piezoelectric bimorphs 3 and 4 of this invention | Curve C of FIG. 6 |
| D | Piezoelectric bimorphs 1 and 2 of this invention | Piezoelectric bimorph 3 and 4 of this invention | Curve D of FIG. 6 | tion of the bimorph elements is achieved without unbalanced conditions in vibration amplitude and also a low voltage driving is made possible, eliminating the drift of the off-set voltage caused by unwanted vibrations of the piezoelectric bimorph elements.

We claim:

1. An angular rate sensor comprising:
   a pair of driving piezoelectric bimorph elements, each to provide tuning fork vibrations;
   a pair of detecting piezoelectric bimorph elements each to detect angular rate;
   a plurality of first joint members each for aligning and coupling together, end to end in respectively orthogonal planes, a respective one of the pair of driving piezoelectric bimorph elements and a respective one of the pair of detecting piezoelectric bimorph elements to form a pair of assemblies; and
   a second joint member to form a tuning fork structure out of the pair of assemblies;
   wherein at least one of the driving piezoelectric bimorph elements and the detecting piezoelectric bimorph elements includes:
   an intermediate electrode and a constant elasticity conductor in between two piezoelectric elements having an identical direction of polarization; and
   two outer electrodes which are electrically connected to each other.

2. An angular rate sensor according to claim 1 with the two outer electrodes of the driving piezoelectric bimorph element and the detecting piezoelectric bimorph element connected electrically to each other by means of an electrically conductive film electrode.

3. An angular rate sensor according to claim 1 with the piezoelectric bimorph elements composed of two piezoelectric elements each of which has an almost identical thickness with each other, bonded together and with the two outer electrodes of each piezoelectric bimorph element made to have an almost identical surface area.

4. An angular rate sensor according to claim 1 with at least either of the driving piezoelectric bimorph element or the detecting piezoelectric bimorph element made to have a small electrode formed on a partial section of either side of the two outer electrodes of the piezoelectric bimorph element and insulated electrically from the rest and also connected electrically to the intermediate electrode of the foregoing piezoelectric bimorph element by means of a conductive film electrode, wherein the conductive film electrode of above serves as the input/output electrode for the piezoelectric bimorph elements.

* * * * *